United States Patent
Aschenbrenner et al.

(10) Patent No.: US 7,436,546 B2
(45) Date of Patent: Oct. 14, 2008

(54) METHOD AND APPARATUS FOR COLOR MANAGEMENT

(75) Inventors: Jean Margaret Aschenbrenner, Boulder, CO (US); Reinhard Heinrich Hohensee, Boulder, CO (US); Yue Qiao, Longmont, CO (US); Nenad Rijavec, Longmont, CO (US); David Earl Stone, Longmont, CO (US)

(73) Assignee: Infoprint Solutions Company, LLC, Boulder, CO (US)

( * ) Notice: Subject to any disclaimer, the term of this patent is extended or adjusted under 35 U.S.C. 154(b) by 515 days.

(21) Appl. No.: 11/077,687

(22) Filed: Mar. 11, 2005

(65) Prior Publication Data

US 2005/0273523 A1 Dec. 8, 2005

Related U.S. Application Data

(60) Provisional application No. 60/569,360, filed on May 7, 2004.

(51) Int. Cl.
| | |
|---|---|
| *G06F 3/12* | (2006.01) |
| *G06F 3/00* | (2006.01) |
| *G06F 15/00* | (2006.01) |
| *G06K 1/00* | (2006.01) |
| *G06K 15/00* | (2006.01) |
| *H04N 1/60* | (2006.01) |
| *G03F 3/08* | (2006.01) |
| *G03F 3/10* | (2006.01) |

(52) U.S. Cl. .............. 358/1.9; 358/1.15; 358/1.18; 358/518; 358/527; 710/5; 710/15

(58) Field of Classification Search .............. 358/502, 358/1.9, 1.15, 504, 2.1, 1.13, 3.06, 3.2, 261, 358/515, 518, 519, 3.23; 715/528, 202; 382/167, 382/276, 162; 400/61; 362/162; 347/224, 347/253; 719/327; 710/5, 15; 705/26; 345/601; 701/114; 101/484
See application file for complete search history.

(56) References Cited

U.S. PATENT DOCUMENTS

| | | | | |
|---|---|---|---|---|
| 5,537,228 | A * | 7/1996 | Dillinger | 358/502 |
| 5,699,489 | A * | 12/1997 | Yokomizo | 358/1.9 |
| 5,704,021 | A * | 12/1997 | Smith et al. | 358/1.9 |
| 5,787,193 | A * | 7/1998 | Balasubramanian | 382/167 |
| 5,806,081 | A * | 9/1998 | Swen et al. | 715/528 |
| 5,809,181 | A * | 9/1998 | Metcalfe | 382/276 |
| 5,818,960 | A * | 10/1998 | Gregory et al. | 382/167 |
| 6,309,117 | B1 * | 10/2001 | Bunce et al. | 400/61 |
| 6,349,146 | B2 * | 2/2002 | Roetling | 382/162 |
| 6,480,299 | B1 * | 11/2002 | Drakopoulos et al. | 358/1.9 |
| 6,580,524 | B1 * | 6/2003 | Weichmann et al. | 358/1.9 |
| 6,642,931 | B1 * | 11/2003 | Haikin et al. | 345/601 |
| 6,646,763 | B1 * | 11/2003 | Estrada | 358/1.9 |
| 6,690,489 | B1 * | 2/2004 | Jacob et al. | 358/1.9 |
| 6,693,718 | B1 * | 2/2004 | Takaoka | 358/1.15 |

(Continued)

*Primary Examiner*—Twyler L. Haskins
*Assistant Examiner*—Jonathan R Beckley
(74) *Attorney, Agent, or Firm*—Duft Bornsen & Fishman, LLP

(57) ABSTRACT

The Management of color presented at end point devices such as a display or printer is based on the implementation of a Color Management Resource (CR). A CMR is an architected resource stored accessibly to a print server or other processor that is used to carry all of the color management information required to render a print file, document, page, or data object.

37 Claims, 10 Drawing Sheets

U.S. PATENT DOCUMENTS

| | | | |
|---|---|---|---|
| 6,750,992 B1 * | 6/2004 | Holub | 358/504 |
| 6,758,574 B1 * | 7/2004 | Roberts | 362/162 |
| 6,788,813 B2 * | 9/2004 | Cooper | 382/167 |
| 6,856,337 B2 * | 2/2005 | Shimomura et al. | 347/224 |
| 6,922,261 B2 * | 7/2005 | Asano | 358/1.9 |
| 6,925,375 B2 * | 8/2005 | Ritter et al. | 701/114 |
| 6,947,163 B2 * | 9/2005 | Takemura | 358/1.15 |
| 6,947,174 B1 * | 9/2005 | Chen et al. | 358/1.9 |
| 6,952,831 B1 * | 10/2005 | Moore | 719/327 |
| 6,995,870 B2 * | 2/2006 | Holub | 358/1.9 |
| 7,038,707 B2 * | 5/2006 | Shimizu | 347/253 |
| 7,068,391 B2 * | 6/2006 | Dewitte et al. | 358/1.9 |
| 7,075,643 B2 * | 7/2006 | Holub | 356/326 |
| 7,079,281 B1 * | 7/2006 | Ng et al. | 358/1.9 |
| 7,136,941 B2 * | 11/2006 | Nguyen et al. | 710/15 |
| 7,164,498 B2 * | 1/2007 | Van Bael | 358/1.9 |
| 7,170,641 B2 * | 1/2007 | Brady | 358/3.06 |
| 7,206,100 B2 * | 4/2007 | Namikata | 358/3.23 |
| 7,216,092 B1 * | 5/2007 | Weber et al. | 705/26 |
| 7,218,405 B1 * | 5/2007 | Aschenbrenner et al. | 358/1.15 |
| 7,218,420 B1 * | 5/2007 | Tai et al. | 358/3.2 |
| 7,274,488 B2 * | 9/2007 | Stevens | 358/1.9 |
| 2002/0118380 A1 | 8/2002 | Krueger et al. | |
| 2003/0058469 A1 * | 3/2003 | Buis et al. | 358/1.15 |
| 2004/0021900 A1 | 2/2004 | Arakawa | |
| 2004/0114164 A1 * | 6/2004 | Linder et al. | 358/1.9 |
| 2004/0141192 A1 * | 7/2004 | Jodra et al. | 358/1.9 |
| 2004/0145758 A1 * | 7/2004 | Lamy et al. | 358/1.9 |
| 2004/0184051 A1 * | 9/2004 | Bailey | 358/1.9 |
| 2004/0252345 A1 * | 12/2004 | Uekusa et al. | 358/2.1 |
| 2004/0257619 A1 * | 12/2004 | Loce et al. | 358/2.1 |
| 2005/0036159 A1 * | 2/2005 | Sharma et al. | 358/1.9 |
| 2005/0036171 A1 * | 2/2005 | Bala et al. | 358/2.1 |
| 2005/0105106 A1 * | 5/2005 | Haikin | 358/1.9 |
| 2005/0146736 A1 * | 7/2005 | Matsuoka et al. | 358/1.9 |
| 2005/0248781 A1 * | 11/2005 | Tin | 358/1.9 |
| 2005/0248787 A1 * | 11/2005 | Aschenbrenner et al. | 358/1.9 |
| 2005/0273523 A1 * | 12/2005 | Aschenbrenner et al. | 710/5 |
| 2005/0273524 A1 * | 12/2005 | Aschenbrenner et al. | 710/5 |
| 2005/0275854 A1 * | 12/2005 | Bailey | 358/1.9 |
| 2006/0017955 A1 * | 1/2006 | Owen et al. | 358/1.13 |
| 2006/0044599 A1 * | 3/2006 | Lipowitz et al. | 358/1.15 |
| 2006/0156942 A1 * | 7/2006 | Hofmann | 101/484 |

* cited by examiner

Fig. 4

Map Data Resource (MDR) Structured Field

| Triplet | Use when specifying a CMR |
|---|---|
| X"02" | Type "DE" : Name<br>Type "BE" : Local ID |
| X"10" | Indication the MDR defines a CMR |
| X"5A" | Offset of document in printfile |
| X"91" | Processing mode: audit/Instruction<br>Scope: page/overlay/data object |

| Length (bytes) | Name | Description |
| --- | --- | --- |
| 4 | Length | CMR Length (inc. length field) |
| 2 | Type | Resource Type |
| 1 | Reserved | Set to zero |
| 1 | CMR Flags | Bit 0 set if CMR is device independent |
| 4 | Reserved | Set to zero |
| 1 | Name L | Name length, up to 250 |
| Name L | CMR Name | UTF-16 encoded name |
| Length-NameL-13 | CMR Data | Resource Data |

1000

METHOD AND APPARATUS FOR COLOR MANAGEMENT

CROSS-REFERENCE TO RELATED APPLICATIONS

The present application is related to and claims priority from Provisional Application No. 60/569,360 filed on May 7, 2004, the content of which is incorporated herein. The present application also related to Ser. No. 11/077,688, titled "Method and Apparatus for Color Management", and Ser. No. 11/077,689, titled "Method and Apparatus for Color Management" filed concurrently herewith.

FIELD OF THE INVENTION

The present invention relates to color printing and more particularly to improving the accuracy and consistency of output in color printing

BACKGROUND TO THE INVENTION

A presentation architecture, such as the Advanced Function Presentation (AFP) architecture, is used to handle input streams and data and output information on many different types of printers—monochrome/color, impact/non-impact, continuous-form/cut-sheet—as well as on other output technologies such as displays. When the information to be output contains color data, it is important that the colors are rendered accurately and consistently across all device technologies. On color devices the colors should be rendered as accurately as the device gamut allows; on monochrome devices the colors should be simulated with accurate and pleasing grayscales.

Heretofore, problems have been encountered in assuring that consistency of output is achieved across a variety of output devices. This arises in part from the varying capability of devices to render color, and in part from the resulting opportunity for color information to be skewed by device characteristics.

Color Management systems have been available on some operating system platforms such as Windows and Macintosh and are applicable to printers and displays functioning with systems using those operating systems. However, there is no presently known comprehensive color management system used in production print environments such as AFP environments. Certain terminology used hereinafter is represented by initials or acronyms. To any extent that such terminology is unclear from the context, greater understanding can be obtained by reference to a standard dictionary of terminology used in the printing industry, such as the dictionary provided by IBM and identified as Publication G544-3973-00.

SUMMARY OF THE INVENTION

Currently available color management mechanisms in data streams, such as Postscript and PDF, provide a number of ways to characterize input color data, but lack mechanisms to specify output operations, such as halftoning, in an device-independent manner. A device-independent instruction cannot be fully contained in such data streams, but must be part of a comprehensive system such as the one described in this invention.

According to a first aspect the present invention provides a method comprising: receiving a document for outputting; determining that a color management resource (CMR) is associated with at least part of a component from the document for outputting; and adding a command into an output data stream for outputting the document at a target output device, the command for invoking the associated CMR during output of the at least part of a component at the target device, the CMR comprising details for use when rendering the colors of the at least part of a component during its output According to a second aspect the present invention provides a data processing apparatus comprising: a document receiver for receiving a document for outputting; an association determiner for determining that a color management resource (CMR) is associated with at least part of a component from the document for outputting; and a command adder for adding a command into an output data stream for outputting the document at a target output device, the command for invoking the associated CMR during output of the at least part of a component at the target device, the CMR comprising details for use when rendering the colors of the at least part of a component during its output.

According to a third aspect the present invention provides an article of manufacture comprising a program storage medium readable by a computer, the medium tangibly embodying one or more programs of instructions executable by a computer to perform a method comprising: receiving a document for outputting; determining that a color management resource (CMR) is associated with at least part of a component from the document for outputting; and adding a command into an output data stream for outputting the document at a target output device, the command for invoking the associated CMR during output of the at least part of a component at the target device, the CMR comprising details for use when rendering the colors of the at least part of a component during its output.

According to a fourth aspect the present invention provides a method comprising: producing computer executable program code; and providing the program code to be deployed to and executed on a computer system; the program code comprising instructions for: receiving a document for outputting; determining that a color management resource (CMR) is associated with at least part of a component from the document for outputting; and adding a command into an output data stream for outputting the document at a target output device, the command for invoking the associated CMR during output of the at least part of a component at the target device, the CMR comprising details for use when rendering the colors of the at least part of a component during its output.

Optionally the CMR is included in the document for output and is copied into the output data stream. Alternatively the target output device has a copy of the CMR in which case including the CMR in the output data stream is not required. Alternatively the document for output includes a reference to the CMR which specifies a name for the CMR. In this case the name is used to locate the CMR in memory and the located CMR is added to the output data stream.

When locating the CMR in memory a search is first performed of the document for output and if the CMR is found it is used. However if it is not found a searchable list of CMRs is accessed and searched in order to locate the CMR.

The CMR associated with the at least part of a component could be specific to the target output device or device independent. If it is device independent, optionally it can be replaced with CMR which is specific to the target output device. In this case the association is changed to be with the device specific CMR, specific to the target output device.

A document for printing may include at least part of a component which is not associated with a CMR. Optionally attributes may be obtained from the at least part of a component and which are then used to select a suitable CMR to associate with it. Optionally if a suitable CMR is not available the attributes may be used to create a CMR which can be associated with the at least part of a component.

For example the CMR is one of an instruction CMR which defines processing which is to be done on the at least part of a component and an audit CMR which defines processing which has been done on the at least part of a component.

For example the details in the CMR relate to at least one of a color conversion, a link color conversion, a halftone screen, and a calibration curve.

Optionally the command to invoke the CMR specifies a scope for the invocation for the CMR. For example the scope may specify the CMR is used only when rendering the at least part of a component, alternatively the scope may specify the CMR is used for a plurality of components and/or subcomponents.

For example an embodiment of the first to second aspects of the present invention could be provided as part of a print server which receives an MO:DCA-P document from an application generator for outputting at a target device. The MO:DCA-P document may include details of a CMR to use when outputting at least part of a component of the document, or may include at least part of a component with defined attributes which the print server can use to select a CMR to be used when outputting the at least part of a component. The print server uses the MO:DCA-P document to generate an IPDS command stream for sending to the target device, the IPDS command stream including commands to invoke the CMR when outputting the MO:DCA-P document.

According to a fifth aspect the present invention provides a method comprising: obtaining a color management resource (CMR) comprising details for use when rendering colors during output of the at least part component of an output document; storing the CMR for later retrieval; storing information relating to the CMR including a name and location of the CMR in storage in a searchable list of CMR information.

According to a sixth aspect the present invention provides a data processing apparatus comprising: an obtainer for obtaining a color management resource (CMR) comprising details for use when rendering colors during output of the at least part component of an output document; a CMR storer for storing the CMR for later retrieval; an information storer for storing information relating to the CMR including a name and location of the CMR in storage in a searchable list of CMR information.

According to a seventh aspect the present invention provides an article of manufacture comprising a program storage medium readable by a computer, the medium tangibly embodying one or more programs of instructions executable by a computer to perform a method comprising: obtaining a color management resource (CMR) comprising details for use when rendering colors during output of the at least part component of an output document; storing the CMR for later retrieval; and storing information relating to the CMR including a name and location of the CMR in storage in a searchable list of CMR information.

According to a eighth aspect the present invention provides a method comprising: producing computer executable program code; and providing the program code to be deployed to and executed on a computer system; the program code comprising instructions for: obtaining a color management resource (CMR) comprising details for use when rendering colors during output of the at least part component of an output document; storing the CMR for later retrieval; storing information relating to the CMR including a name and location of the CMR in storage in a searchable list of CMR information.

Optionally a CMR is obtained by receiving it as a CMR. Alternatively a color profile, such as an ICC profile, is received and this is then used to create the CMR.

The obtained CMR may be specific to an output device or independent of any particular output device. If the CMR is independent, optionally, when the CMR information is stored in the searchable list it is further linked to the information of a device specific CMR which could be used for the output device. This enables the device specific CMR to be easily located after finding the device independent CMR to which it is linked. This is useful when replacing a device independent CMR with a device specific CMR.

Optionally a component for inclusion in a output document will be received, the component including attributes relating to its color. In this case the attributes are used to select a CMR from the searchable list and associate it with the at least part of the component.

For example the CMR is one of an instruction CMR which defines processing which is to be done on the at least part of a component, and an audit CMR which defines processing which has been done on the at least part of a component.

Optionally the details in the CMR relate to at least one of a color conversion, a link color conversion, a halftone screen, and a calibration curves.

For example an embodiment of the fifth and sixth aspects of the present invention could provided as part of an object installer of a print server, the object installer being usable for defining CMR'S, and optionally printable components, to the print server.

According to a ninth aspect the present invention provides a method comprising: receiving a output data stream which defines a document for output; determining that a first color management resource (CMR) is associated with at least part of a component from the document, the CMR comprising details for use when rendering the colors of the at least part of a component during its output; and invoking the CMR during output of the at least part of a component.

According to a tenth aspect the present invention provides a data processing apparatus comprising: a receiver for receiving a output data stream which defines a document for output; an association determiner for determining that a first color management resource (CMR) is associated with at least part of a component from the document, the CMR comprising details for use when rendering the colors of the at least part of a component during its output; and a CMR invoker for invoking the CMR during output of the at least part of a component.

According to an eleventh aspect the present invention provides an article of manufacture comprising a program storage medium readable by a computer, the medium tangibly embodying one or more programs of instructions executable by a computer to perform a method comprising: receiving a output data stream which defines a document for output; determining that a first color management resource (CMR) is associated with at least part of a component from the document, the CMR comprising details for use when rendering the colors of the at least part of a component during its output; and invoking the CMR during output of the at least part of a component.

According to a twelfth aspect the present invention provides a method comprising: producing computer executable program code; and providing the program code to be deployed to and executed on a computer system; the program code comprising instructions for: receiving a output data stream which defines a document for output; determining that a first color management resource (CMR) is associated with at least part of a component from the document, the CMR comprising details for use when rendering the colors of the at least part of a component during its output; and invoking the CMR during output of the at least part of a component.

The document may include a subcomponent of the at least part of a component which is associated with a different (second) CMR to the at least part of a component. Optionally a determination is made that this situation exists and the second CMR is invoked to replace the first color management resource during output of the at least part of a subcomponent. Further in this case, optionally the first CMR is re-invoked when output of the at least part of a subcomponent is complete.

For example the CMR is one of an instruction CMR which defines processing which is to be done on the at least part of a component, and an audit CMR which defines processing which has been done on the at least part of a component.

For example the details in the CMR relate to at least one of a color conversion, a link color conversion, a halftone screen, and a calibration curve.

For example the ninth and tenth aspects could be provided as part of an output device to output an MO:DCA-P document using an IPDS command stream received from a print server, the IPDS command stream including commands to invoke a CMR during output of at least part of a component of the MO:DCA-P document.

Embodiments of the present invention: achieve greater consistency of output across a range of devices; provide accurate color representation, to the best of the capability of the supported devices; provide consistent output across a variety of types of data created by a variety of applications; and provide flexibility for users in accomplishing these purposes.

DESCRIPTION OF THE FIGURES

Some of the purposes of the invention having been stated, others will appear as the description proceeds, when taken in connection with the accompanying drawings, in which:

FIG. 4 is an illustration of the triplets which can be used in an MDR structured field when referencing a colour management resource for an MO:DCA-P document component.

FIG. 10 is an illustration of a data-structure which is used to define a CMR.

DESCRIPTION OF A PREFERRED EMBODIMENT OF THE INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention. In particular, while the context for this disclosure is color management in an Advanced Function Presentation (AFP) environment a skilled person will realize how the technique can be applied to other presentation environments such as PostScript, PDF, and PCL.

The preferred embodiment of the present invention involves use of a processor such as a print server, for example, which receives a document, processes it, and forwards it as a data-stream to an end point presentation device such as a printer, print engine, display, or the like. Typically, and as contemplated by this invention, such a processor has associated storage capability, such as disk files, in which program modules such as instructions and profiles can be accessibly stored for execution on the processor as desired. This will now be described in terms of the AFP environment.

In the AFP architecture a Mixed Object: Document Content Architecture (MO:DCA) printfile, which may contain multiple documents, is provided to a print server. The print server then generates an Intelligent Printer Data Stream (IPDS) command stream for sending to a printer or other output device for the purpose of outputting the printfile. In its most complex form, an MO:DCA document contains data objects along with data structures which define the document's layout and composition features. This form is called an MO:DCA presentation (MO:DCA-P) document. The preferred embodiment of the present invention is described with reference to MO:DCA-P documents.

Figure 1:
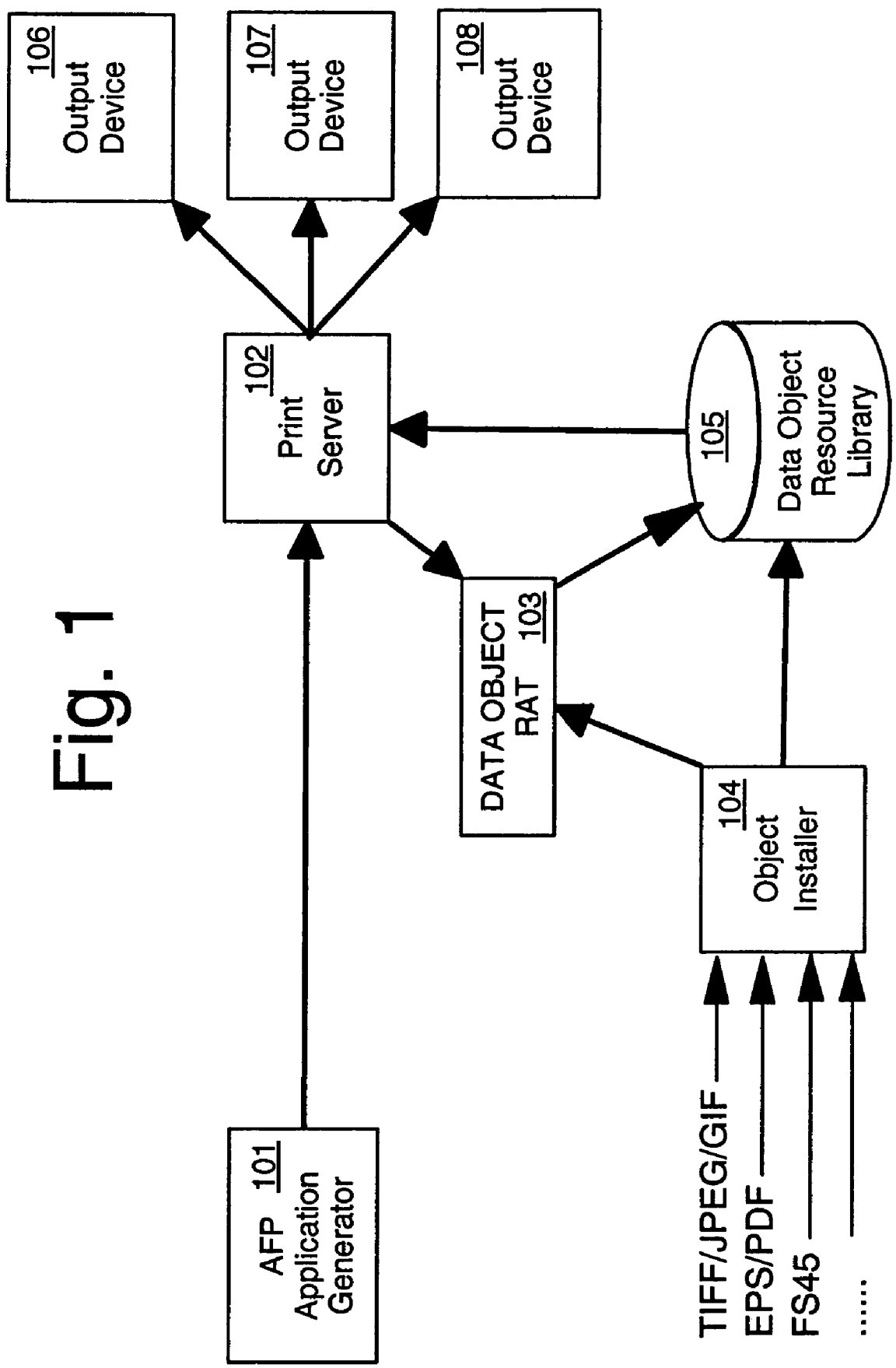
FIG. 1 is a schematic diagram of an example AFP environment in which the preferred embodiment of the present invention will be advantageously applied.

FIG. 1 is a schematic diagram of an example AFP environment in which the preferred embodiment of the present invention will be advantageously applied. In the figure an AFP application generator 101 sends an MO:DCA-P document to print server 102 for outputting. Note that for the purposes of this description it is assumed that the MO:DCA-P document includes a reference to a data object which is accessible to print server 102. The data object could, for example, be a TIFF/JPEG/GIF object, a EPS/PDF object, an FS45 object, or other object of a defined format. Such data objects are installed via Object Installer 104 which stores data objects in a data object resource library 105 and further stores details of a data object, and where it is installed, in an entry of a Data Object Resource Access Table (RAT) 103. The Data Object RAT 103 is effectively an index which the print server 102 may use to locate the data object in storage.

When the print server 102 receives the MO:DCA-P document from AFP application generator 101 it converts it to an IPDS command stream for forwarding to an output device. As part of this process it obtains the name from the data object reference included in the document and uses the name to locate the entry in the Data Object RAT 103 which relates to the data object. From this the Print Server obtains the data object from the Data Object Resource Library 105 and imbeds it into the IPDS command stream. The completed IPDS command stream is then forwarded by the printer server 102 to an appropriate output device (106, 107, 108). The output device could be, for example, a printer, a color display or other presentation device, and further could be a device which processes an IPDS command stream for subsequent output by a different device.

The components of an MO:DCA-P document are defined with a syntax which consists of self-describing structures. Structured fields are the main MO:DCA structures and these are used to encode MO:DCA commands. A structured field starts with an introducer which uniquely identifies the command, provides a total length for the command, and specifies additional control information such as whether padding bytes are present. The introducer is followed by up to 32,759 data bytes. Data may be encoded using fixed parameters, repeating groups, keywords, and triplets. Fixed parameters have a meaning only in the context of the structure that includes them. Repeating groups are used to specify a grouping of parameters which can appear multiple times. Keywords are self-identifying parameters which consist of a one-byte unique keyword identifier followed by a one-byte keyword value. Triplets are self-identifying parameters which contain a one-byte length, a one-byte unique triplet identifier, and up to 252 data bytes. Keywords and triplets have the same semantics wherever they are used. Together, these structures define a syntax for MO:DCA documents which provides for orderly parsing and flexible extensibility.

An MO:DCA-P printfile is defined in a hierarchy of components and the printfile component is the highest level of the hierarchy. Documents are at the next level and can be made up of pages, and page components are at the intermediate level of the hierarchy. Further, pages can be made up of objects and objects components are at the lowest level of the hierarchy. Object components can, for example, be bar codes, graphics, images, and presentation text. Multiple documents can be grouped together into a print-file.

At each level of the hierarchy certain sets of MO:DCA structured fields are permissible. The document, pages and objects are bounded by a pair of structured fields, known as begin-end pairs, which define an envelope for the data-stream components. This feature enables a processor which is not fully compliant with the MO:DCA to bypass those objects which are beyond its scope, and to process an MO:DCA-P printfile to the best of its abilities.

Figure 2:
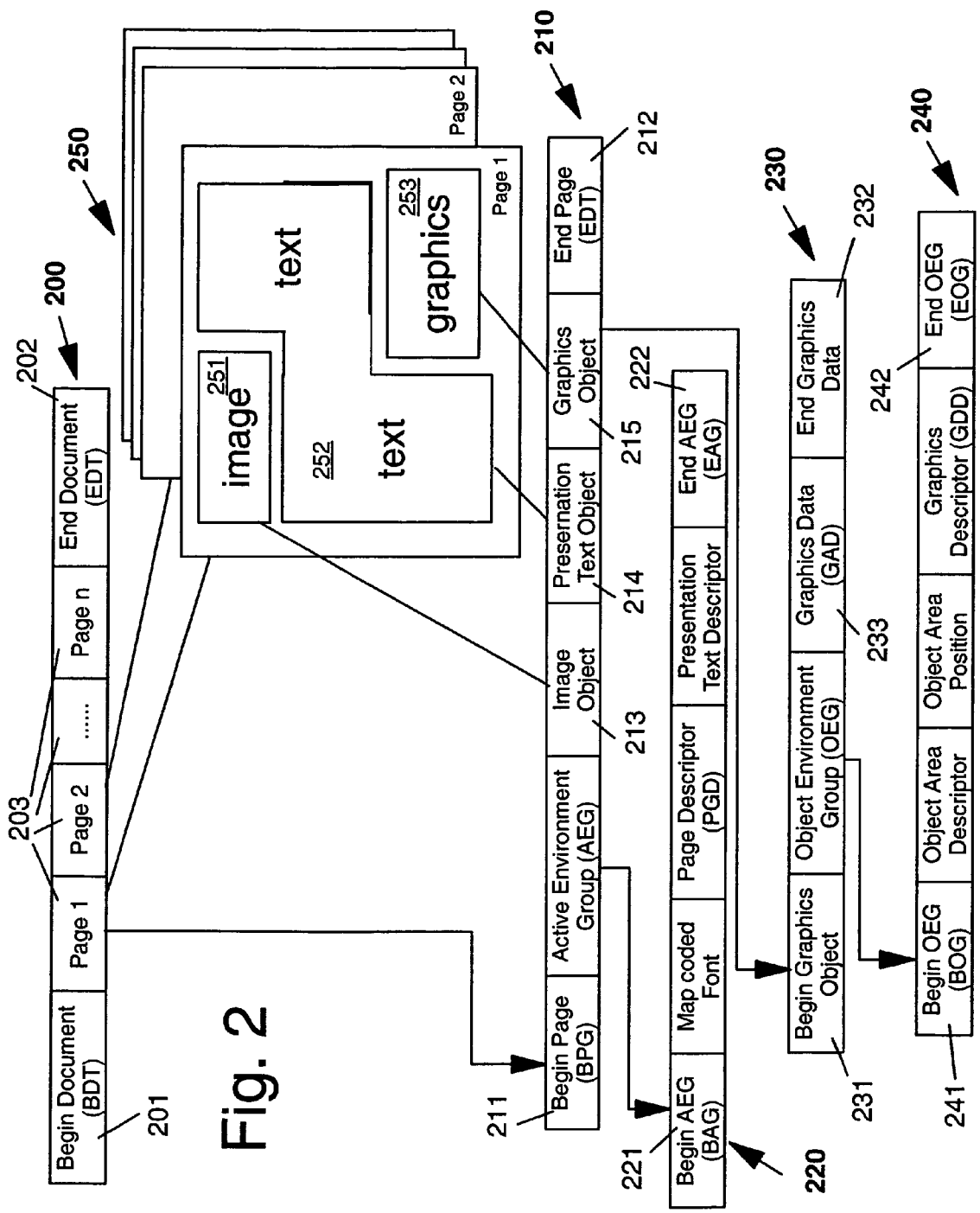
FIG. 2 is a diagram which illustrates the hierarchy of the main components which comprise a Mixed Object: Document Content Architecture-Presentation (MO:DCA-P) document.

FIG. 2 is a diagram which illustrates the main components of this hierarchy for an example MO:DCA-P document which defines a document 250 for printing. The document 250 comprises several pages and the content of page 1 is illustrated. This page contains an image object 251, a section of text 252, and a graphics object 253 such as a bar chart.

The highest level component of the MO:DCA-P document of FIG. 2 is the document component which is defined by a begin-end pair comprising a "Begin Document" (BDT) structured field 201 and ends with an "End Document" (EDT) structured field 202. Each page within the document is independent from any other page and the BDT structured field is followed by separate details 203 of each page to be printed. Each of these separate details 203 comprise a page component 210 which is defined by a begin-end pair comprising a "Begin Page" (BPG) structured field 211 and an "End Page" (EPG) structured field 212. The BPG structured field is followed by an Active Environment Group (AEG) 220 which defines resource and layout information for the page such as measurement units, page width, and page depth. The page component 210 also includes details of each of the objects which make up the page. These details comprise image object details 213, presentation text object details 214 and graphics object details 215. For example the Graphics objects details are contained in a graphic object component 230 which is defined by a begin-end pair comprising a "Begin Graphics Object" (BGR) structured field 231 and an "End Graphics Object" (EGR) structured field 232. The BGR structured field is followed by an Object Environment Group (OEG) 240 and the graphics object data 233. The OEG 240 defines resource and layout information for the graphics object such as placement and orientation of the graphics object on the page. Note that, although not shown in the figure, the image object details 213 and presentation text details 214 will comprise an image object component and a presentation text component, respectively, which are similar to the graphics object component 230, but with appropriate begin-end pairs.

Note that alternatively to including the actual data object in the MO:DCA-P document, for example, as shown in FIG. 2 for graphics object 233, a reference to the data object can be included. For example, the reference to the data object can be contained in a resource object component instead of a data object component, such a resource object component being defined by a begin-end pair comprising a Begin Resource (BRS) structured field and an End Resource (ERS) structured field. Further such a resource object can include reference to a secondary resource object.

Further note that not all possible components of an MO:DCA-P document have been described with reference to FIG. 2. For example the document can include overlay components which are page-like components which define their own environment parameters.

According to the preferred embodiment of the present invention, objects which are termed Color Management Resources (CMRs) are used in the presentation process to render colors accurately and consistently. Each CMR carries a single type of color management resource. Examples of CMR types are: color conversions, halftone screens, calibration curves, and link color conversions.

A Color Conversion CMR defines device-dependent color, for example the color generated by an input device such as a scanner or the color rendered by an output device such as a printer, by tying the color to a device-independent color space such as CIELab. For example this may be achieved by using a Color Conversion CMR to carry an ICC profile.

A Link Color Conversion CMR defines information which enables rendering of an object with device-dependent color on an output device which has different device-dependent color. For example, the CMR defines a conversion from RGB in the object to CMYK in the printer using a look-up table which can be used to convert directly from RGB to CMYK.

A Halftone Screen CMR defines information for converting, for example, from a color described by 8 bits to a color described by less than 8 bits. For example a halftone screen CMR can be used to modify and tune the output appearance.

A Calibration Curve CMR defines information which can be used to modify output color of a component, for example, to lighten or darken component output. For example each process color (C, M, Y, K) in a printer may be specified with 8 bits giving 256 intensity levels and the CMR may specify that the printer converts a given intensity level in the color component to a different intensity level. For example this may be used to modify a component color before a halftone screen CMR is applied.

A CMR can be an audit CMR or an instruction CMR. This usage distinction is specified by the CMR invocation controls. An audit CMR reflects processing which has been done on an object, whereas an instruction CMR specifies processing that is to be done to an object. For example an audit CMR defines how the color in the printfile was created, for example, by which scanner or digital camera. For example an instruction CMR defines how to render the colors of the object during output at the target device.

Further, a CMR can be device independent or device specific. For example it can be specific to a particular type of object or a particular output device. In this case a print server may replace a CMR specified in an MO:DCA-P document. For example if the data stream specifies a device independent CMR, the print server may replace it with a more suitable previously installed device specific CMR. For example, with regard to previously installed CMR's, the print server may, in some way, link one or more device specific CMR's to a device independent CMR in order to make such replacement possible.

In the preferred embodiment of the present invention a CMR is identified and referenced with a unique name which is specified in a header included in the CMR. The name is structured in an architected manner so that it can be used to intelligently substitute one CMR for another, such as in the case where a device-specific CMR is substituted for a device-independent CMR. The architected naming convention will allow such substitution to take place even when the CMR to be replaced is not available to the presentation system. For example, one or more of the following parameters could be used to make up a CMR name: device identifier; device model number; device manufacturer; CMR version number; quality functionality identifier; and appearance intent identifier.

CMRs are installed for access by a print server using a workstation-based CMR Installer (for example, an extension of the Windows-based Font Installer that was developed for TrueType/OpenType fonts). This program will (1) upload the CMR into a resource library of a supporting system such as, for example, a PSF/390, PSF/400, or IPM print server, and (2) build a Resource Access Table (RAT) entry which maps the CMR name to a file name, to an object ID (OID), and possibly to more device-specific CMRs.

CMRs can be associated with components at each layer of a presentation document hierarchy, for example, printfile (group of documents with optional inline resources), document, page/overlay, and data object. As part of this association a processing mode is defined which specifies whether the CMR reflects processing that has been done to the component ('audit' processing mode) or processing that is to be done to the component ('instruction' processing mode). A CMR is processed as an AFP resource by a print server so that, for example, it can be downloaded, captured, and used repeatedly without requiring multiple downloads.

For example, an MO:DCA-P printfile which is received for printing by a print server may include one or more CMRs and/or one or more references to CMRs. Included (inline) CMR's are imbedded into the resource group of the printfile. Referenced (external) CMRs have previously been installed on a print server using a CMR installer and are accessible through a data source of the print server. As a result the print server adds these to the IPDS command stream which is forwarded to the output device. For example, the CMR Installer can take ICC profiles for an input or output device, convert them into CMRs, and upload the CMRs to the print server.

If an MO:DCA-P printfile received by a print server includes a data object, or a reference to a data object which is accessible at the print server through a data source, such a data object may include a reference to a CMR or be associated by the print server with a CMR. In either of these cases the print server adds details of the CMR to the IPDS command stream sent to the output device. Alternatively the print server may obtain attributes from the data object which enables the print server to associate it with a CMR which is selected based on those attributes and is accessible by the print server.

An IPDS command stream which a print server provides to the output device for outputting includes commands or triplets to activate and invoke a CMR as and when needed. A CMR must be activated in order to be invoked and an invocation command/triplet defines when the CMR is invoked and optionally defines a scope for the invocation, such a scope being, for example, the processing of a specific document, page or data object. If a new CMR is invoked under the scope of a previous CMR, the previous CMR is suspended for the scope of the new CMR. Commands/triplets to activate and invoke a CMR may be specified in an MO:DCA-P document received by a print server such that they are included in the IPDS command stream sent to an output device, alternatively the commands/triplets are added by the print server to the IPDS command stream.

Figure 3:
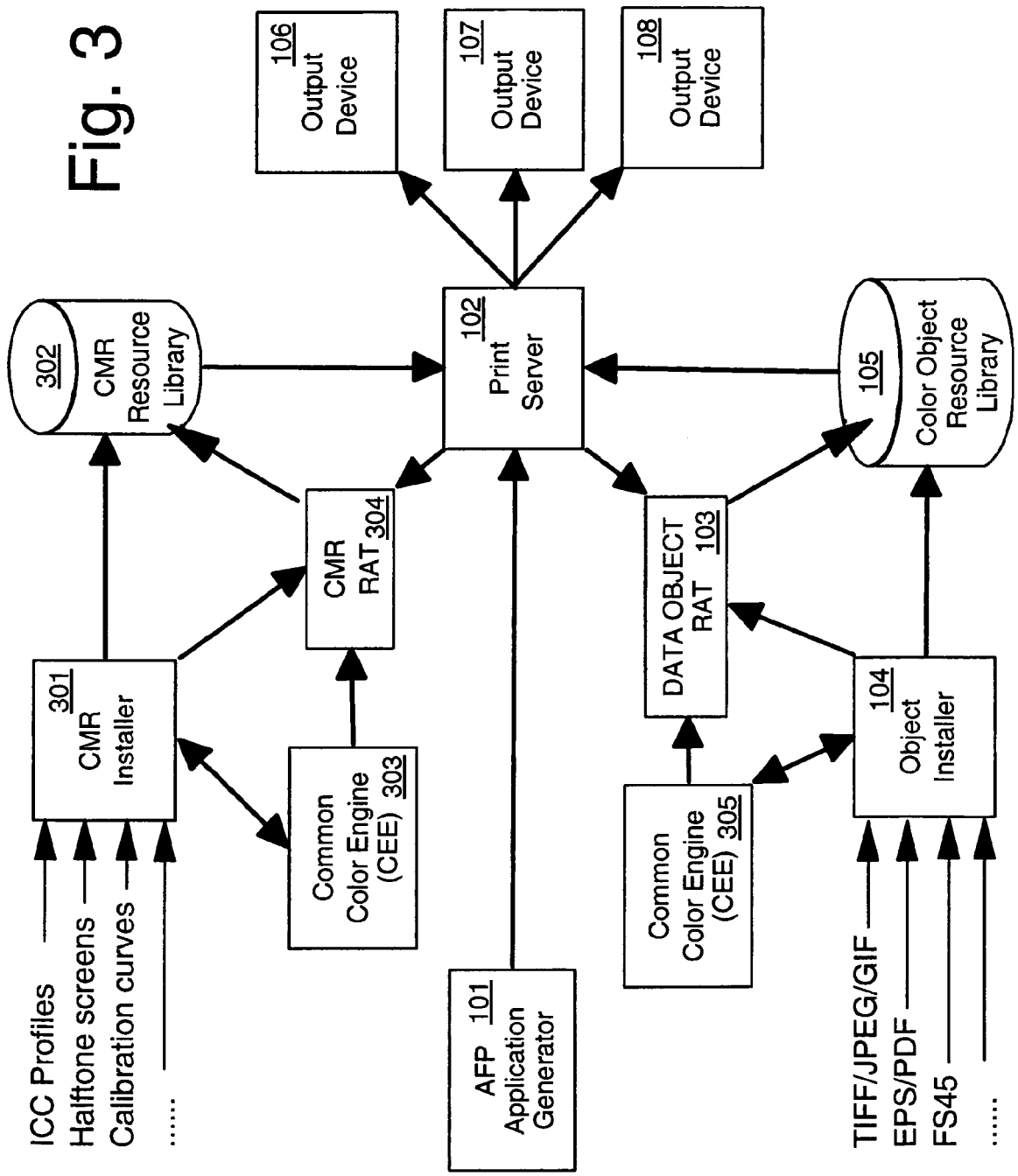
FIG. 3 is a schematic diagram of an example AFP environment which includes a color management system used to generate consistent output on color and monochrome devices.

FIG. 3 is a schematic diagram of the preferred embodiment of the present invention in which an AFP environment includes a color management system used to generate accurate and consistent output on color and monochrome devices. Note that in FIG. 3 several components are common to FIG. 1 and have the same reference numerals as in FIG. 1. These perform similar functions as described for FIG. 1 and accordingly this description of FIG. 3 will only mention where differences exist from FIG. 1.

In FIG. 3 it is assumed that the MO:DCA-P document sent to print server 102 by AFP application generator 101 further includes, in addition to a reference to a data object, a reference to an external CMR which has been previously been installed and is accessible to print server 102.

In FIG. 3 a CMR was previously installed via CMR installer 301 which stored the CMR in a CMR resource library 302 and further stored details of the CMR including its name and location in storage in an entry of a CMR Resource Access Table (RAT) 304. The CMR may have been created using the Common Color Engine (CCE) 303 which can be used to generate a CMR, for example through a user interface or from an existing profile, such as an ICC profile. Further the CMR may, for example, be device independent and usable for a plurality of devices, or device specific and usable only for a specific device or specific type of device. If the CMR is device independent, details may also be included in the CMR RAT 304 entry for the CMR which link it to one or more device specific CMRs.

Further with regards to the data object referenced in the data-stream, when this was installed using object installer 104 it may, for example, include a reference to a previously installed CMR. Such a reference to the CMR may be included in the Data Object RAT entry for the data object. Further the object installer 104 may involve Common Color Engine (CCE) 305, which could be the same or a different CCE to CCE 303. Such involvement may be required for example if the data object was installed without reference to a CMR in which case the CCE 305 inspects the contents of the data object and either generates a new CMR based on the data object contents or locates an existing CMR suitable for the data object. Note that if CCE 305 is involved in installing a data object it may also access CMR RAT 304 and CMR Resource library 302, although such access is not shown in the figure.

When the print server 102 receives the MO:DCA-P document from AFP application generator 101 it converts it to an IPDS command stream. As part of this process it obtains the name of the CMR from the reference in the data-stream and uses the name to locate the entry in the CMR RAT 304 which relates to the CMR. From this the Print server 102 obtains the CMR and imbeds it and commands to activate and invoke it, into the IPDS command stream. However if the CMR is a device independent CMR which is linked to device specific CMRs, the print server may replace the device independent CMR with a device specific CMR which is specific to the intended output device. Further the print server 102 obtains the name of the data object from the data object reference and uses the name to locate the entry in the Data Object RAT 103 which relates to the data object. As a result the Print Server 102 obtains the data object and imbeds it into the IPDS command stream. However the Data Object RAT 102 entry may further include details of a CMR to use when processing the data object, such details including the name and processing mode of the CMR, the processing mode indicating whether it is an audit CMR or instruction CMR. As a result the Print Server 102 obtains the CMR via the CMR RAT 304 and imbeds it, or a linked device specific CMR, into the IPDS command stream with commands to invoke it before the data object is processed and use for the duration of the data object. For example an audit CMR could be a color conversion CMR which contains the ICC profile of a digital camera which was used to create the data object.

In an MO:DCA-P printfile a Map Data Resource (MDR) structured field is used to specify a resource which is required for the presentation of an MO:DCA printfile component, such as a font or a referenced data object. In the preferred embodiment of the present invention an MDR structured field is further used to specify a CMR to be used when processing a printfile component. For example an MDR structured field can be included in a Format Definition associated with the printfile, or at an appropriate place in the MO:DCA-P printfile. FIG. 4 shows the triplets which are used in an MDR structured field when specifying a CMR. The first triplet is the X'02' triplet 401 which specifies, with type "DE", the name of the CMR, and optionally with type "BE", a Local ID (LID). The name is used as an index into the CMR RAT and as a result must be sufficient to distinguish the CMR from other CMRs with an entry in the CMR RAT. The LID may be used internally by some data objects to reference the CMR, in which case the MDR ties the LID to the CMR name. The next triplet is the X'10' triplet 402 which is used to indicate that the MDR contains a reference to a CMR. The third triplet is the X'5A' triplet 403 which is used to identify a specific document, in the printfile, to which the CMR relates. Accordingly the triplet specifies an offset into the printfile at which the document is defined and is therefore is only required when associating a CMR with a specific document. Finally the X'91' triplet 404 is used to specify both a processing mode for the CMR, that is whether the CMR is an audit or instruction CMR, and a scope of the CMR, that is whether it relates to a page, overlay or data object.

FIGS. 5 to 9 illustrate schematically how, in the preferred embodiment of the present invention, an external CMR is associated with various components of an MO:DCA-P printfile. For example in non-AFP environments a CMR could be tied into a JDF job ticket which gives a print-file level scope to the CMR.

Figure 5:
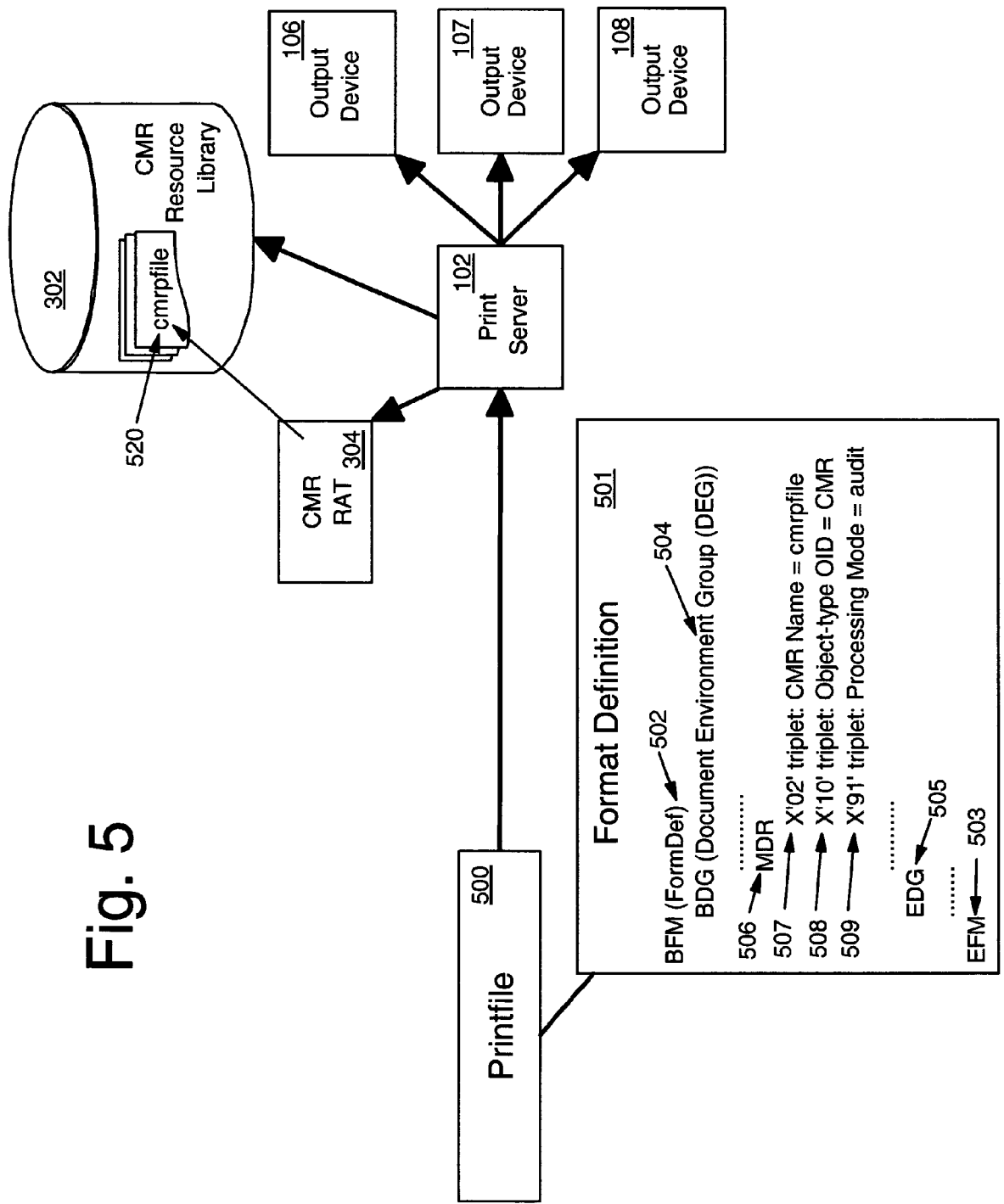
FIG. 5 is a schematic diagram which shows how an example CMR, which is referenced from an MO:DCA-P Form Definition (FormDef), is associated with all documents in a print-file.

FIG. 5 shows this for an example audit CMR which is associated with all document components in a printfile. For example, such a CMR could be a color conversion CMR which defines all device-dependent RGB color in the printfile by adding it to the CIELab color space. A CMR is associated with a printfile using an MDR in a FormDef which is invoked for the printfile by the job submitter. In the figure Printfile 500 has an associated Format Definition (Formdef) 501 which contains a reference to a CMR "cmrpfile" 520 which is stored in the CMR resource Library 302 and referenced from the CMR RAT 304. Reference to the CMR is included in the Formdef which is defined by a begin-end pair comprising a BFM (Begin Form Map) structured field 502 and an EFM (End Form Map) structured field 503. The BFM structured field is followed by a Document Environment Group which is defined by a begin-end pair comprising a BDG (Begin Document Environment Group) structured field 504 and an EDG (End Document Environment Group) structured field 505. Contained within the Document Environment Group (DEG) is an MDR (Mapped Data Resource) structured field 506 which specifies the CMR. Accordingly, in the MDR structured field the X'02" triplet 507 specifies the name of the CMR "cmrpfile", the X'10' triplet 508 specifies that the MDR as refers to a CMR, and the X'91' triplet 509 specifies that the CMR is an audit CMR. Accordingly when print server 102 receives Printfile 501 for processing it obtains the name of the CMR from the MDR structured field 506 and uses it to locate the entry for the CMR in CMR RAT 304. From this entry it locates the CMR 520 in CMR Resource Library 302 and includes it in the IPDS command stream which is subsequently sent to an appropriate output device.

Figure 6:
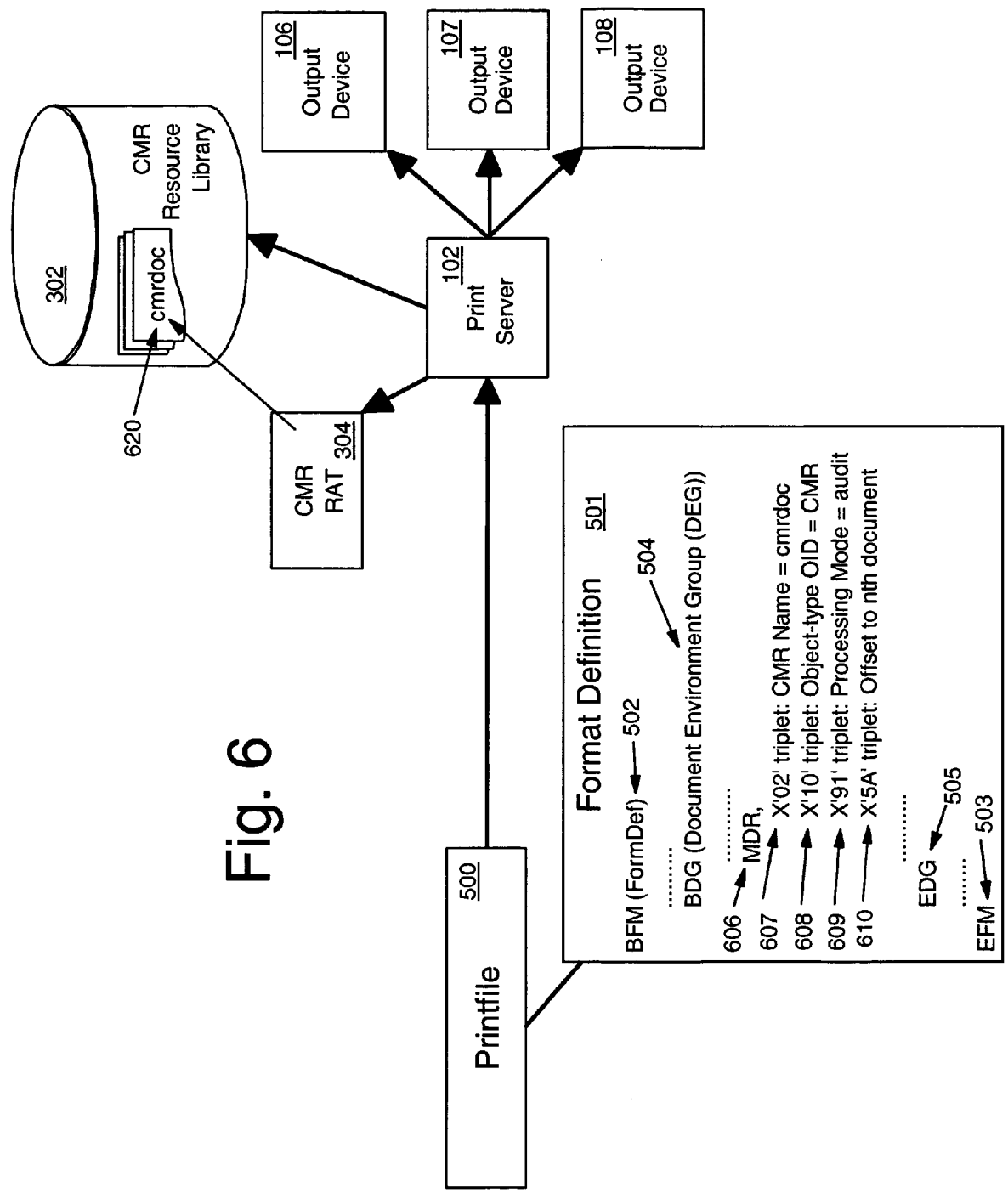
FIG. 6 is a schematic diagram which shows how an example CMR, which is referenced from an MO:DCA-P Form Definition, is associated with a specific document in a print-file.

FIG. 6 illustrates schematically how, in the preferred embodiment of the present invention, an example audit CMR "cmrdoc" 620 is associated with a specific document component in a printfile. This is achieved in a similar manner to that in which a CMR is associated with all document components in a printfile, that is, in an MDR which is specified in a Document Environment Group of a FormDef. However, in this case the MDR structured field used to identify the CMR specifies an additional triplet which indicates the document with which the CMR is to be associated. In FIG. 6 the printfile 500 is associated with Formdef 501 which references a CMR "cmrdoc" 620. Accordingly an MDR structured field 606 is included in which the X'02' triplet 607 specifies the name of the CMR "cmrdoc", the X'10' triplet 608 specifies that the MDR as refers to a CMR, the X'91' triplet 609 specifies that the CMR is an audit CMR, and further an X'5A' triplet 610 specifies the document with which the CMR is associated, for example this can be an offset where "n" specifies the n'th document of the printfile.

Figure 7:
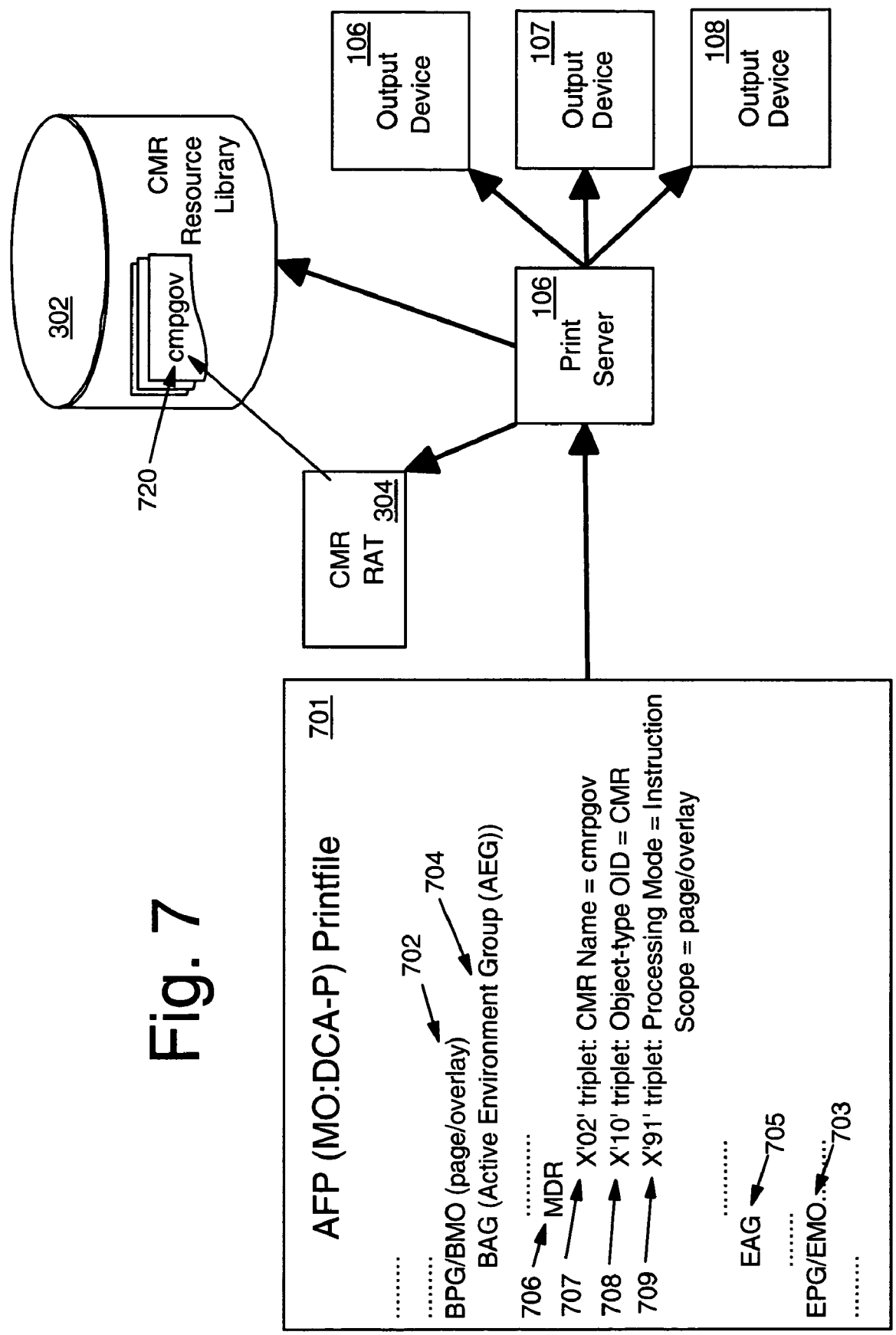
FIG. 7 is a schematic diagram which shows how an example CMR, which is referenced from an MO:DCA-P page/overlay, is associated with a specific page/overlay of a document in a print-file.

FIG. 7 illustrates schematically how, in the preferred embodiment of the present invention, an example instruction CMR "cmrpgov" 720 is associated with a page or overlay component of a document component. This is achieved by including an MDR which defines a CMR in the Active Environment Group (AEG) for the page/overlay, and by indicating that the CMR is tied to the page/overlay. In FIG. 7 printfile 701 includes a page/overlay component which is defined by a begin-end pair comprising either a BPG (Begin Page) or a BMO (Begin Overlay) structured field 702 and either an EPG (End Page) or an EMO (End Overlay) structured field 703, respectively. The BPG/BMO structured field is followed by an Active Environment Group which is defined by a begin-end pair comprising a BAG (Begin Active Environment Group) structured field 704 and an EAG (End Active Environment Group) structured field 705. Contained within the Active Environment Group is an MDR (Mapped Data Resource) structured field 706 in which the X'02' triplet 707 specifies the name of the CMR "cmrpgov", the X'10' triplet 708 specifies that the MDR refers to a CMR, and the X'91' triplet 709 specifies both that the CMR is an instruction CMR and that the scope of the CMR is a page or overlay component.

With regards to data object components there are several ways in which these can be associated with a CMR depending on, for example, how the data object component is specified in an MO:DCA-P document component, and further, if the appropriate data object was previously installed, whether it was associated with a CMR during installation.

For example, if a data object is installed with a workstation-based Object Installer, the Installer can choose to tag the object with one or more CMRs using the RAT entry that is built for the data object. The data object itself is not changed and can be installed in its native, unaltered format. This is an implicit association of a CMR to a data object since the object itself does not specify the association in any manner and is unaware of it. For example, when installing an IOCA FS45, the Installer might tag this object with an audit color conversion CMR which carries the Infoprint Color 130 Plus color profile. In this case the MO:DCA-P document component need not include reference to the CMR.

Figure 8:
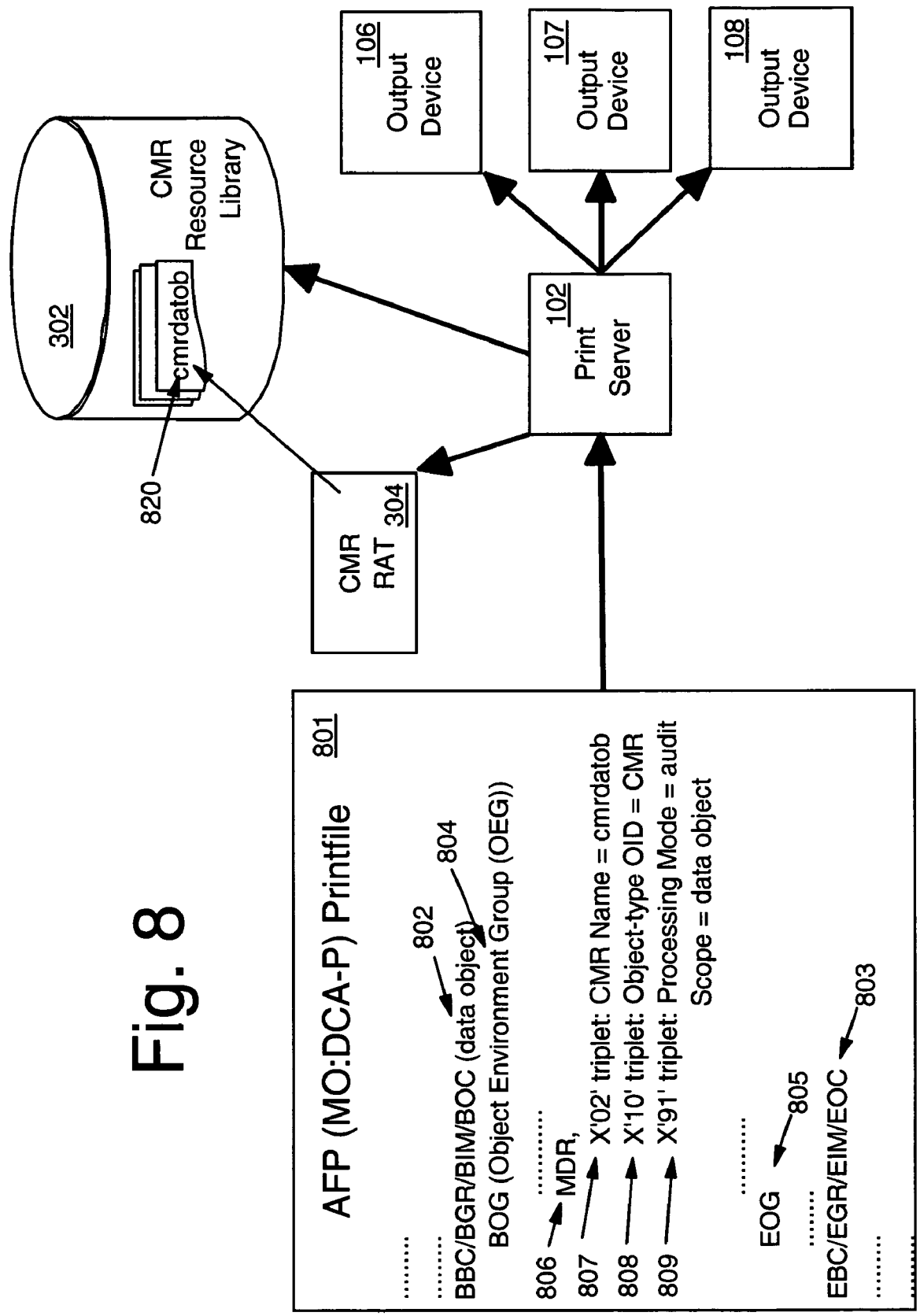
FIGS. 8 and 9 are schematic diagrams which shows two ways in which an example CMR, which is referenced from an MO:DCA-P data object, is associated with a specific data object of a document in a print-file.
Figure 9:
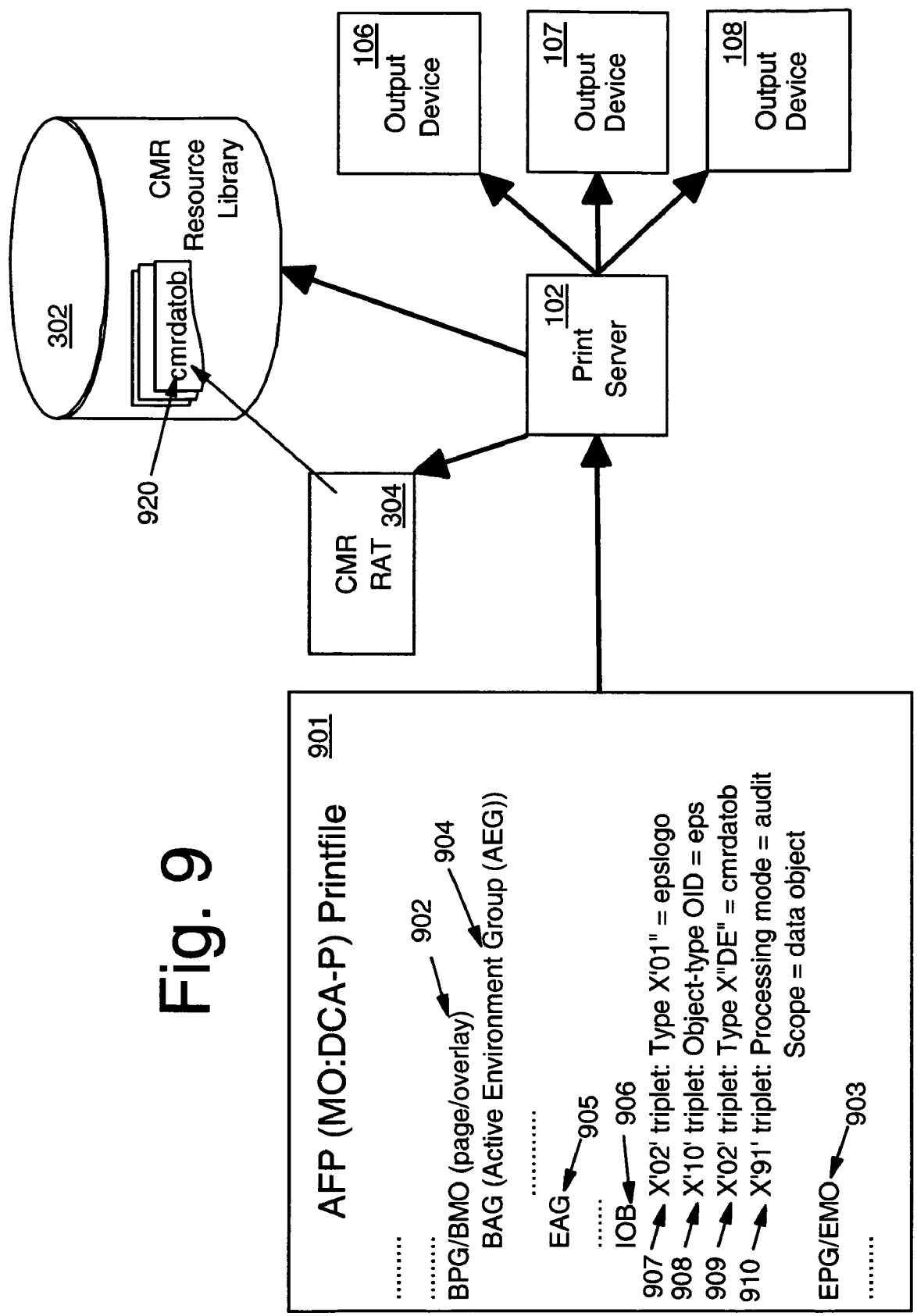

Alternatively, for example, the data object component in the MO:DCA-P document component may reference the CMR using an MDR in its Object Environment Group (OEG), and this is shown schematically in FIG. 8 for a data object CMR "cmrdatob" 820. In the figure, printfile 801 includes a data object component which is defined by a begin-end pair comprising either a BBC (Begin Bar Code Object), a BGR (Begin Graphics Object), a BIM (Begin Image Object), or a BOC (Begin Object Container) structured field 802 and either an EBC (End Bar Code Object), an EGR (End Graphic Object), an EIM (End Image Object), or an EOC (End Object Container) structured field 803, respectively. The BBC/BGR/BIM/BOC structured field is followed by an Object Environment Group which is defined by a begin-end pair comprising a BOG (Begin Object Environment Group) structured field 804 and an EOG (End Object Environment Group) structured field 805. Contained within the Object Environment Group (OEG) structured field is an MDR (Map Data Resource) structured field 806 in which the X'02' triplet 807 specifies the name of the CMR "cmrdatob", the X'10' triplet 808 specifies that the MDR refers to a CMR, and the X'91' triplet 809 specifies both that the CMR is an audit CMR and that the scope of the CMR is a data object. Note that in this case, although not shown in the figure, the MDR must also be included in the Active Environment Group (AEG) of the page/overlay component which contains the MDR.

Alternatively, for example, if a data object is included on a page with an Include Object (IOB) structured field, the IOB may associate a CMR to the object. This is shown schematically in FIG. 9 for a data object CMR "cmrdatob" 920. In the figure the printfile 901 includes a page/overlay component which is defined by a begin-end pair comprising either a BPG (Begin Page) or a BMO (Begin Overlay) structured field 902 and either an EPG (End Page) or an EMO (End Overlay) structured field 903, respectively. The page/overlay is followed by an Active Environment Group which is defined by a begin-end pair comprising a BAG (Begin Active Environment Group) structured field 904 and an EAG (End Active Environment Group) structured field 905. Further the BPG/BMO structure field includes a data object with an Include Object (IOB) structured field 906 which defines an "espologo" data object with an X'02' triplet 907 using FQN Type X'01', and an X'10' triplet 908. The data object is then associated with a CMR by further specifying, in the IOB structured field 906, the name of the CMR "cmrdatob" in an X'02' triplet 909 using FQN type X'DE'. and the processing mode and scope of that CMR in an X'91' triplet 910. Note that in this case, although not shown in the figure, an MDR with the same information must also be included in the Active Environment Group (AEG) of the page/overlay component which contains the IOB structured field. Further note that this association can be implicit, in which case there is no reference to the CMR from within the object, or explicit, in which case the CMR is referenced from within the object by a local ID (LID), and this LID is tied to the CMR reference on the IOB with an FQN type 'BE' triplet.

Note that a CMR associated with a data object component may optionally be referenced explicitly with a LID associated with a CMR as an alternative to the CMR Name. In this case the LID is referenced within the data object in accordance with rules established by the data object. For example, the LID might be invoked from within an image tile in an IOCA FS45 object. In this case, the CMR may not apply to the complete data object, and the scoping rules are defined by the data object (IOCA FS45 in this case). When a CMR is invoked explicitly in a data object using a LID, the LID must either be mapped to the CMR name in an MDR in the relevant data object component's OEG, or it must be referenced on the IOB which includes the data object using an X'02' triplet with an FQN type X'BE' which specifies the LID and immediately follows the FQN type X'DE' for the CMR.

When a print server processes a reference to an external CMR in an MO:DCA-P document it uses the name specified for the CMR to locate an appropriate entry in the CMR RAT. A RAT entry maps a CMR resource name (CMRname) to the file name of the CMR and to other parameters needed to process the CMR. The RAT entry may also map the CMR reference to other device-specific CMRs which should be used in place of the CMR to which the RAT entry relates.

In the preferred embodiment of the present invention the RAT used for CMRs is analogous to the MO:DCA TrueType Font RAT but is a separate table with filename "IBM_ColorManagementResource.rat". The RAT entry for a referenced CMR is defined syntactically with a repeating group (RG). Each RG contains a length, a header, and one or more self-identifying table vectors (TVs) which specify processing information. The header specifies the generic object-type OID for CMRs and a set of flags that are unique to CMR RAT RGs. The TVs are similar to MO:DCA triplets and are differentiated by their type. The following TVs are defined:

CMR name TV: specifies the CMR name that is used to reference the CMR; this name is used as an index into the RAT File name TV: specifies the file name with which the CMR is installed CMR OID TV: specifies the CMR object OID with which the CMR can be captured by the printer. This OID is computed using an architected algorithm, for example an MD-5 checksum of the complete object, and uniquely identifies the CMR.

Device-specific CMR TV: specifies the CMR name of a device-specific CMR that is mapped to the referenced CMR; this TV may be specified multiple times. The device type can be derived from the CMR Name.

This structure of a RAT entry enables a device-independent CMR referenced in the data stream to be replaced by a device-specific CMR. This is because the RAT RG can include one or more device-specific CMR TV's which are used to map a CMR name to one or more device specific CMRs. This enables the print server, which knows the target device type, to select one or more appropriate CMR's to use in place of the CMR that is referenced in the data stream. The device to which a device specific CMR relates is specified in the CMR Resource name, which is then used to re-access the RAT to find the file name and other processing information for that CMR.

However, when the Print Server is searching for a CMR in the RAT, it is known whether the reference is to an audit CMR or an instruction CMR, because this is specified in the reference to the CMR specified in the MO:DCA-P printfile. If the reference is to an audit CMR, the first CMR found to match the CMR name is used, and all other CMRs that may be specified in that RAT RG are ignored.

Alternatively, if the reference is to an instruction CMR which is device independent the printer server searches the RAT RG for TV's which identify device-specific CMRs given the output device type. If an appropriate device-specific CMR is found, it is used, but if no TV's are found the device-independent CMR will be used. If the reference is to am instruction CMR which is device specific it is used directly.

Device-specific CMRs that are specified in a RG are located using the name specified in the Device specific name TV to re-index the RAT. When a matching RAT RG is found, the file name and/or object OID is used to locate and process the device-specific CMR.

Note that a CMR can also be carried in a print-file level resource group as part of an MO:DCA-P printfile. Such a CMR is termed an inline CMR because it is included in the printfile and therefore there is no requirement to search for it using the CMR RAT. In this case the CMR is first wrapped in a BOC/EOC object container, which in turn is wrapped in a BRS/ERS resource envelope. When resolving a CMR reference in an MO:DCA-P document component the print server must first search the printfile resource group for an inline CMR. If one exists the CMRname is matched against the CMRnames which are specified on the BRS structured fields of the resource containers:

If no match is found, the search continues with the RAT. If a match is found, the CMR Header is examined to determine whether the CMR is device-independent or device-specific;

If a device-specific CMR is found, it is used. (Note that an inline device-specific CMR can be invoked with a data stream reference to a device-independent CMR by wrapping the device-specific CMR in BOC/EOC, and then carrying that container in a BRS/ERS which matches the device-independent CMRname.);

If a device-independent CMR is found and if it is an audit CMR, it is used; and

If the CMR is device-independent and it is an instruction CMR, the search continues with the RAT. If the RAT specifies device-dependent CMRs for this CMR reference, they are used; if not, the inline CMR is used.

Having located the appropriate CMR or CMR's the print server generates an IPDS (Intelligent Print Data Stream) command stream for the MO:DCA-P Printfile. In an IPDS command stream, CMRs are activated and deactivated like all other IPDS resources. A Host-Assigned ID (HAID) is assigned during activation, but a CMR is not used until it is explicitly invoked.

With regard to CMR invocation note that the IPDS architecture includes the concept of a state machine where the printer processes various commands from the IPDS Command stream; each command is either only allowed within particular states or causes a transition from the current state into a new state. The states are predefined and represent a set of related printer functions; for example, "page state" is where all of the work to construct a page is done, "graphics state" is where graphic drawing takes place, "home state" is the starting state where most printer-control functions take place.

In the preferred embodiment of the present invention the method by which CMRs are invoked is different according to the state of the IPDS architected state machine. In the "home state" level CMRs can be invoked using an ICMR command. Alternatively, in the "page state" or "object state", a CMR is invoked using an ICMR triplet which is specified on an IPDS command which is associated with the component being processed.

The ICMR command and ICMR triplet identify the CMR being invoked using the Host-Assigned ID which was assigned when the CMR was activated, and optionally an internal identifier if the CMR is being associated with just a portion of the object. Further the ICMR command provides a reset flag which indicates the all CMRs that were invoked by the previous ICMR command, should be un-invoked.

The interaction of CMRs at different levels of an IPDS command stream hierarchy is based on a set of pre-determined rules. For example, in the preferred embodiment of the present invention only a single CMR of a particular type may be in use at any given time. When a CMR is invoked at a given level or state, it replaces—for that level or state only—any CMR of the same type that is currently in use at a lower level. For example, if color conversion CMR (x) was invoked in the "home state", and color conversion CMR (y) was invoked for an IOCA object in the "graphics state", color conversion CMR (y) becomes the color conversion CMR in use for the duration of the IOCA object processing, or the duration of the IOCA object state. Once the IOCA object state is terminated, color conversion CMR (x) again becomes color conversion CMR in use.

For example, a formal CMR-usage hierarchy can be briefly described as follows:

Printfile or document level invocations are accomplished with a home-state IPDS command called "Invoke CMR" (ICMR). This command invokes the CMR by HAID and specifies that the CMR is to be used with appropriate color data whenever there is no appropriate CMR specified at a lower level in the CMR hierarchy';

Page or overlay level invocations are accomplished with an Invoke CMR triplet specified on a Logical-Page-Descriptor command for a page or overlay or on an Include-Overlay command;

Data object level invocations are accomplished with an Invoke CMR triplet specified on the command which begins the data object or the command that includes a data object within a page or overlay (Include-Data-Object command). In this case, the Invoke CMR triplet may assign an internal resource ID to the CMR. The internal resource ID is used within a data object to explicitly request the CMR for a portion of the data object; and Printer-default CMRs are provided for use when no host-invoked CMR of a needed type is provided.

The CMR scoping rules of the preferred embodiment of the present invention require that an output device, such as a printer, applies the CMR-usage hierarchy when selecting which CMR to use. For example, a FormDef may specify that an Infoprint Color 130+ Color Conversion CMR be used as an audit CMR to process all CMYK colors in a document. Inside that document, an IOCA FS45 may have been generated with CMYK for a color printer "x", and be tagged with the appropriate Color Conversion audit CMR. According to the CMR usage hierarchy of the preferred embodiment of the present invention when the FS45 is processed, the printer suspends the current 130+ Color Conversion CMR and invokes the color printer "x" CMR for the duration of the FS45. When the FS45 processing is completed, the printer resumes the 130+ CMR as the 'current' Color Conversion CMR.

Note that within the IPDS architecture, Color Management Resources (CMRs) are handled as non-presentation, object-container resources. CMRs can be downloaded in home state using a WOCC/WOC/End command sequence; however, the CMR is not used with color data until it has been invoked by another IPDS command (and perhaps an internal resource ID).

IPDS printers which support the ICMR command, or an ICMR triplet specifed with another command, have a default CMR for each CMR type that can be used with that printer. The printer default CMRs are in effect (automatically invoked) as soon as the printer is initialized or reinitialized.

When an ICMR command or triplet is processed by an IPDS printer, the printer first performs any specified resets. Then each ICMR entry is processed in sequence; an entry identifies a specific CMR for a specific CMR type. This newly invoked CMR temporarily replaces the printer-default CMR of that type and becomes the "current CMR of that type". However, when internal resource IDs are used in ICMR entries, each CMR type can have several invoked CMRs, as follows:

Each ICMR which does not include an entry which specifies an internal resource ID causes that CMR to be invoked and to become the current CMR of that type. The current CMR is then used for all color objects that use this type of CMR, don't explicitly use an internal resource ID, and do not have a different CMR of that type invoked at a lower level in the hierarchy.

Each ICMR which includes an entry with an internal resource ID causes that CMR to be invoked and to be associated with the internal resource ID. This CMR, however, is not used with subsequent color data until the specific internal resource ID has been invoked. For each supported CMR type, there can be a current CMR and zero or more "CMRs with internal resource IDs" invoked at the same time. In IOCA, for example, an IOCA local ID is used as the internal resource ID and the use and scope of the CMR-with-local-ID is defined by the IOCA architecture.

Some CMRs need to be invoked and stay active for an entire printfile. For IPDS environments, this type of invocation is accomplished at the beginning of a print file with an ICMR command whose scope is "until reset". At the end of the print file (or at the beginning of the next print file), the print server should reset this type of CMR invocation back to printer defaults. In the same manner, CMRs can be managed at a document level.

Some CMRs need to be invoked and stay active for a specific presentation object. For IPDS environments, this type of invocation is accomplished at the beginning of a presentation object with an ICMR command whose scope is "until end of object". Accordingly, when processing of the presentation object begins any CMR currently in scope is suspended and the CMR for the presentation object is invoked and becomes current. On completion of processing of the presentation object the scope of presentation object CMR ends and any suspended CMR is resumed.

CMRs that are associated with an internal resource ID are used within presentation objects; their specific scope within the object is defined by the presentation object.

Some CMRs need to be invoked and stay active for a specific page or overlay. For IPDS environments, this type of invocation is accomplished before the beginning of the page or overlay with an ICMR triplet on an LPD commandat the beginning of a page or overlay with an ICMR command whose scope is "until end of page or overlay". When the printer encounters the next EP command, all CMRs of scope "until end of page or overlay" are un-invoked and the previously current, or previously invoked CMR with the same internal resource ID, or printer-default CMR of that type replaces the CMR of scope "until end of page or overlay".

CMRs can also be printer resident or captured. In this case, they are activated via the Activate Resource (AR) command; but, just like the download case, another IPDS command is required to invoke a CMR. An object OID is used to identify a resident (or captured) resource; the object OID is generated, for example by the CMR Installer using an architected algorithm such as an MD-r checksum, and uniquely identifies the CMR.

CMRs are deactivated via the Deactivate Data Object Resource (DDOR) command.

A specific, CMR-enabled IPDS printer can understand and use CMRs of various types, but there are likely to be CMR types defined that are not understood or used by a particular printer. For example, a printer could return a list of supported CMR types in the XOH-OPC reply and will issue a NACK if an unsupported CMR type is downloaded. To prevent unwanted "unsupported CMR type" NACKs and to make CMR processing more efficient, the host presentation services program should check the list of supported CMR types before downloading a CMR.

A triplet functioning as a CMR Descriptor is specified in the MO:DCA MDR structured field and carries control information for the CMR. In particular, it identifies whether the CMR is to be processed as an audit CMR or as an instruction CMR. The triplet is copied into the AR or WOCC command that activates this CMR object. The printer must use the CMR in the manner indicated by this triplet.

To allow the print services program to filter out unsupported CMRs (thereby improving performance), an XOH-OPC reply self-defining field could provide a list of supported CMR types.

In the IPDS architecture, errors are identified by a 3-byte exception ID with the 1st byte predefined for an error class. For errors found within a CMR object, the 1st byte needs to be X'02' to indicate a specification check; the next 2 bytes are error specific. The $2^{nd}$ byte indicates, with a value of X'5D', that this is a CMR-object error and the $3^{rd}$ byte contains the CMR exception code (defined within the CMR architecture).

For this type of exception ID, there is a special 2-byte field (sense bytes 16-17) that contains the CMR TagID value.

Therefore, CMR-object errors reported in IPDS NACKs are of the form X'025D..ee' with "ee" being the CMR exception code; the TagID value is in bytes 16-17. For example:

EC-080005 would be reported in an IPDS command stream as X'025D..05', with X'0800' in sense bytes 16-17

EC-FFFF0E would be reported in an IPDS command stream as X'025D..0E', with X'FFFF' in sense bytes 16-17.

In a system which uses CMR's it is desirable to have a mechanism which will allow customers to install and manage color resources. A primary facility can a CMR Installer. For example, the CMR Installer for AFP Systems runs on Windows systems and can install CMRs in resource libraries for print servers on z/OS, OS/400, AIX, and Windows systems. The CMR Installer will provide functions to upload the CMRs to the server, to update the Resource Access Table (RAT), or its equivalent, so these resources can be used, and also to associate color management resources to color objects.

The CMR Installer will take a list of the color management resources and copy them to a server. The resources are files and will be stored into locations specified by the server resource search paths. The user will be also able to specify custom locations. CMRs are always installed using the RAT, and cause a RAT entry to be built that maps the CMR resource name (CMRname) to the file name of the CMR and to other parameters needed to process the CMR. The entry may also map the CMR reference to other device-specific CMRs which should be used in place of the file that corresponds to the CMR reference.

Another facility is the Resource Object Installer which will also be able to install the actual color data object resources, i.e., color objects such as IOCA FS45s and PDFs, that are to be printed on a page. A RAT entry is built that maps the name of the color object (which is also the name that is used to reference the object in the document) to the file name with which the object is stored. This RAT entry may optionally point to CMRs that are used to process the color object. For example, a TIFF image points to an audit CMR giving the input color space defining, say, a particular RGB color space. In addition, the RAT may point to "presentation hints" CMR for the image. Such "presentation hints" may specify, for example, an ICC rendering intent such as "relative calorimetric".

In a system handling color objects from a variety of sources, one of the major issues is determining the nature of the color present in the object. For example, a digital camera may produce a RGB JPEG file, where the RGB is device-specific. The Common Color Engine (CCE) is a component which can be called by the object installer and analyzes the objects and deduces, to the best of its capability, the characteristics of the color data.

For the above example, the CCE may analyze the JPEG APP tags, where a comment can often be found giving the camera make and model. If this particular model is known to the Resource Object Installer, then the relevant ICC Profile can be generated, packaged in a Color Conversion CMR, and associated with the image.

In addition to this heuristic color characteristics determination, there will also be a way for the user to specify the missing color information, such as the ICC Profile.

Once the color management resources related to the object have been determined, the Resource Object Installer can install the object in the server resource library and associate the CMRs with it using the RAT entry for the object. Alternatively, the object can be wrapped in an object container and the CMRs referenced from within the MO:DCA wrapper. In the latter case, the object need not be "installed", and could be placed directly into the printfile.

FIG. 10 is a diagram of a data structure 1000 for defining a CMR according to the preferred embodiment of the present invention. In the figure a CMR definition starts with a 4 byte length filed which defines the length of the structure including this length field. This is followed by a 2 byte field which indicates the type of the CMR, for example one of: Halftone; Calibration Curve; Color Conversion; and Link Color Conversion. The data structure further includes a one byte flag field in which bit 0 is set if the CMR is device independent, and two name fields which comprise a 1 byte name length followed by the CMR name of the length specified. Finally, following the name is the CMR data which comprises color management information according to the specified type.

Note that while the present disclosure is couched strictly in the terms of an AFP system, it will be clear to those skilled in the art that the CMR mechanism can also be applied to other data-stream environments. Most notably, the present invention can be applied to PostScript and PDF printing in such a manner that the extra functionality is available to the servers and devices that implement it, while the data stream will print correctly (though perhaps with lesser color fidelity) on generic devices. While the AFP implementation is a preferred embodiment, a skilled person will understand that alternative embodiments that implement the invention in the Postscript/PDF environment.

What is claimed is:

1. A method comprising:
receiving at a print server an Advanced Function Presentation (AFP) document for outputting on an output device;
determining that an AFP color management resource (CMR) is associated with a component from the AFP document for outputting, wherein the CMR includes information for rendering the colors of the component on the output device;
generating on the print server an Intelligent Printer Data Stream (IPDS) command stream from the AFP document, wherein the IPDS command stream includes commands for invoking the associated CMR during output of the component on the output device; and
transmitting the IPDS command stream from the print server to the output device.

2. The method of claim 1 further comprising:
obtaining a name of the CMR associated with the component;
using the name to locate the CMR in memory; and
adding the CMR to the IPDS command stream.

3. The method of claim 2 wherein using the name to locate the CMR in memory comprises:
searching for the CMR in the document for outputting; and
responsive to not finding the CMR in the document for outputting, searching for the CMR in a collection of CMR's.

4. The method of claim 1 wherein determining comprises:
responsive to determining that the component is associated with an output device independent CMR, replacing the association to be with a CMR specific to the output device.

5. The method of claim 1 wherein determining comprises:
obtaining attributes of the component; and
associating a CMR with the component, wherein the CMR is selected based on the obtained attributes.

6. The method of claim 5 further comprising:
using the obtained attributes to create the CMR which is associated with the component.

7. The method of claim 1 wherein the CMR comprises at least one of a color conversion, a link color conversion, a halftone screen, and a calibration curve.

8. The method of claim 1 wherein the CMR is either an instruction CMR, which defines processing which is to be done on the component, or an audit CMR, which defines processing which has been done on the component.

9. The method of claim 1 wherein the commands specify a scope for the invocation of the CMR.

10. A data processing apparatus comprising:
a document receiver for receiving an Advanced Function Presentation (AFP) document for outputting on an output device;
an association determiner for determining that an AFP color management resource (CMR) is associated with a component from the AFP document for outputting, wherein the CMR includes information for rendering the colors of the component on the output device;
an Intelligent Printer Data Stream (IPDS) command stream generator for generating an IPDS command stream from the AFP document, wherein the IPDS command stream includes commands for invoking the associated CMR during output of the component on the output device; and an IPDS command stream transmitter for transmitting the IPDS command stream to the output device.

11. The apparatus of claim 10 further comprising:
a name obtainer for obtaining a name of the CMR associated with the component;
a name user for using the name to locate the CMR in memory; and
a CMR adder for adding the CMR to the IPDS command stream.

12. The apparatus of claim 10 wherein the determiner comprises:
a replacer, responsive to determining that the component is associated with an output device independent CMR, for replacing the association to be with a CMR specific to the output device.

13. The apparatus of claim 10 wherein the determiner comprises:
an attribute obtainer for obtaining attributes of the component; and
a CMR associator for associating a CMR with the component, wherein the CMR is selected based on the obtained attributes.

14. The apparatus of claim 12 further comprising:
an attribute user for using the obtained attributes to create the CMR which is associated with the component.

15. An article of manufacture comprising a program storage medium readable by a computer, the medium tangibly embodying one or more programs of instructions executable by a computer to perform a method comprising:
receiving at a print server an Advanced Function Presentation (AFP) document for outputting on an output device;
determining that an AFP color management resource (CMR) is associated with a component from the AFP document for outputting, wherein the CMR includes information for rendering the colors of the component on the output device;
generating at the print server an Intelligent Printer Data Stream (IPDS) command stream from the AFP document, wherein the IPDS command stream includes commands for invoking the associated CMR during output of the component on the output device; and
transmitting the IPDS command stream from the print server to the output device.

16. The article of manufacture of claim 15, the method further comprising:
obtaining a name of the CMR associated with the component;
using the name to locate the CMR in memory; and
adding the CMR to the IPDS command stream.

17. The article of manufacture of claim 15 wherein determining comprises:
responsive to determining that the component is associated with an output device independent CMR, replacing the association to be with a CMR specific to the output device.

18. The article of manufacture of claim 15 wherein determining comprises:
obtaining attributes of the component; and
associating a CMR with the component, wherein the CMR is selected based on the obtained attributes.

19. The article of manufacture of claim 15, the method further comprising
using the obtained attributes to create the CMR which is associated with the component.

20. A method comprising:
producing computer executable program code; and
providing the program code to be deployed to and executed on a computer system;
the program code comprising instructions for:
receiving at a print server an Advanced Function Presentation (AFP) document for outputting on an output device;
determining that an AFP color management resource (CMR) is associated with a component from the AFP document for outputting, wherein the CMR includes information for rendering the colors of the component on the output device;
generating at the print server an Intelligent Printer Data Stream (IPDS) command stream from the AFP document, wherein the IPDS command stream includes commands for invoking the associated CMR during output of the component on the output device; and
transmitting the IPDS command stream from the print server to the output device.

21. The method of claim 20, the program code comprising further instructions for:
obtaining a name of the CMR associated with the component;
using the name to locate the CMR in memory; and
adding the CMR to the IPDS command stream.

22. The method of claim 20 wherein the instructions for determining comprising instructions for:
in response to determining that the component is associated with an output device independent CMR, replacing the association to be with a CMR specific to the output device.

23. The method of claim 20 wherein the instructions for determining comprises instructions for:
obtaining attributes of the component; and
associating a CMR with the component and which is selected based on the obtained attributes.

24. The method of claim 20, the program code comprising further instructions for:
using the obtained attributes to create the CMR which is associated with the component.

25. A method comprising:
receiving a color profile of a known format;
using the color profile to create an Advanced Function Presentation (AFP) color management resource (CMR) comprising details for use when rendering colors during output of the component of an output document;
storing the CMR for later retrieval; and
storing information relating to the CMR including a name and location of the CMR in storage in a searchable list of CMR information.

26. The method of claim 25, wherein the CMR is independent of an output device, and the method further comprises:
linking the stored information to information relating to a different CMR which is specific to an output device.

27. The method of claim 25 further comprising:
receiving a component for inclusion in a output document;
obtaining attributes of the component; and
using the obtained attributes to select a CMR from the searchable list and associate it with the component.

28. The method of claim 25 wherein the details relate to at least one of a color conversion, a link color conversion, a halftone screen, and a calibration curve.

29. A data processing apparatus comprising:
a profile receiver for receiving a color profile of a known format;
a CMR creator for using the color profile to create an Advanced Function Presentation (AFP) color management resource (CMR) comprising details for use when rendering colors during output of the component of an output document;
a CMR storer for storing the CMR for later retrieval; and
an information storer for storing information relating to the CMR including a name and location of the CMR in storage in a searchable list of CMR information.

30. The apparatus of claim 29, wherein the CMR is independent of an output device, and the method further comprises:
an information linker for linking the stored information to information relating to a different CMR which is specific to an output device.

31. The apparatus of claim 29 further comprising:
a component receiver for receiving a component for inclusion in a output document;
an attribute obtainer for obtaining attributes of the component; and
an attribute user for using the obtained attributes to select a CMR from the searchable list and associate it with the component.

32. An article of manufacture comprising a program storage medium readable by a computer, the medium tangibly embodying one or more programs of instructions executable by a computer to perform a method comprising:
receiving a color profile of a known format;
using the color profile to create an Advanced Function Presentation (AFP) color management resource (CMR) comprising details for use when rendering colors during output of the component of an output document;
storing the CMR for later retrieval; and
storing information relating to the CMR including a name and location of the CMR in storage in a searchable list of CMR information.

33. The article of manufacture of claim 32, wherein the CMR is independent of an output device, and the method further comprises:
linking the stored information to information relating to a different CMR which is specific to an output device.

34. The article of manufacture of claim 32, the method further comprising:
receiving a component for inclusion in a output document;
obtaining attributes of the component; and
using the obtained attributes to select a CMR from the searchable list and associate it with the component.

35. A method comprising:
producing computer executable program code; and
providing the program code to be deployed to and executed on a computer system;
the program code comprising instructions for:
receiving a color profile of a known format;
using the color profile to create an Advanced Function Presentation (AFP) color management resource (CMR) comprising details for use when rendering colors during output of the component of an output document;
storing the CMR for later retrieval; and
storing information relating to the CMR including a name and location of the CMR in storage in a searchable list of CMR information.

36. The method of claim 35, wherein the CMR is independent of an output device, and the program code comprises further instructions for:
linking the stored information to information relating to a different CMR which is specific to an output device.

37. The method of claim 36 wherein the program code comprises further instructions for:
receiving a component for inclusion in a output document;
obtaining attributes of the component; and
using the obtained attributes to select a CMR from the searchable list and associate it with the component.

* * * * *